(12) United States Patent
Rysgaard

(10) Patent No.: US 10,034,148 B2
(45) Date of Patent: *Jul. 24, 2018

(54) CONFIGURING A MULTICAST OR BROADCAST WIRELESS NETWORK

(71) Applicant: Intellectual Ventures Holding 81 LLC, Las Vegas, NV (US)

(72) Inventor: Bent H. Rysgaard, Aalborg Oest (DK)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,233

(22) Filed: Oct. 5, 2015

(65) Prior Publication Data

US 2016/0029181 A1    Jan. 28, 2016

Related U.S. Application Data

(63) Continuation of application No. 14/086,357, filed on Nov. 21, 2013, now Pat. No. 9,154,321, which is a continuation of application No. 12/169,563, filed on Jul. 8, 2008, now Pat. No. 8,599,733.

(51) Int. Cl.
| | |
|---|---|
| H04W 4/06 | (2009.01) |
| H04L 12/24 | (2006.01) |
| H04L 5/00 | (2006.01) |
| H04W 72/00 | (2009.01) |
| H04L 12/18 | (2006.01) |
| H04W 92/04 | (2009.01) |

(52) U.S. Cl.
CPC ............. *H04W 4/06* (2013.01); *H04L 5/0055* (2013.01); *H04L 12/18* (2013.01); *H04L 12/189* (2013.01); *H04L 41/0803* (2013.01); *H04W 72/005* (2013.01); *H04W 92/04* (2013.01)

(58) Field of Classification Search
None
See application file for complete search history.

(56) References Cited

U.S. PATENT DOCUMENTS

| | | | |
|---|---|---|---|
| 7,116,641 | B2 | 10/2006 | Lim |
| 7,423,973 | B2 | 9/2008 | Chen et al. |
| 7,450,933 | B2 | 11/2008 | Kwak et al. |

(Continued)

FOREIGN PATENT DOCUMENTS

| | | |
|---|---|---|
| JP | 20050033786 | 2/2005 |
| JP | 20050236988 | 9/2005 |

(Continued)

OTHER PUBLICATIONS

Cain et al., "Internet Group Management Protocol, Version 3," Network Working Group, Request for Comments: 3376 (Oct. 2002).

(Continued)

*Primary Examiner* — Candal Elpenord
(74) *Attorney, Agent, or Firm* — Volpe and Koenig, P.C.

(57) ABSTRACT

A networking device may multicast a Multicast-Broadcast over a Single Frequency Network (MBSFN) message to a cluster of network elements and receive acknowledgement messages from the cluster of network elements. The MBSFN message may be multicasted to unacknowledged network elements in the cluster of network elements, subsequent to a time period to receive an acknowledgement message from a first and a second network element.

8 Claims, 5 Drawing Sheets

(56) References Cited

U.S. PATENT DOCUMENTS

| | | | |
|---|---|---|---|
| 7,774,004 | B2 | 8/2010 | Inoue et al. |
| 2004/0258008 | A1 | 12/2004 | Inoue et al. |
| 2007/0171865 | A1 | 7/2007 | Kato |
| 2008/0025240 | A1* | 1/2008 | Casaccia ............... H04L 1/1887 370/312 |
| 2008/0045224 | A1 | 2/2008 | Lu et al. |
| 2008/0056219 | A1 | 3/2008 | Venkatachalam |
| 2009/0207771 | A1 | 8/2009 | Lindskog et al. |
| 2009/0323646 | A1 | 12/2009 | Ketchum et al. |
| 2010/0265867 | A1 | 10/2010 | Becker et al. |
| 2011/0044225 | A1 | 2/2011 | Rinne et al. |

FOREIGN PATENT DOCUMENTS

| | | |
|---|---|---|
| JP | 20070538463 | 12/2007 |
| WO | 2007149349 A2 | 12/2007 |

OTHER PUBLICATIONS

Deering, "Host Extensions for IP Multicasting," Network Working Group, Request for Comments: 1112 (Aug. 1989).

Fenner, "Internet Group Management Protocol, Version 2," Network Working Group, Request for Comments: 2236 (Nov. 1997).

Final Rejection, U.S. Appl. No. 12/169,563 (now U.S. Pat. No. 8,599,733), dated Oct. 7, 2011.

Hauge et al.; "Multi-Case in 3G Networks: Employment of Existing IP Multicase Protocols in UMTS." Sep. 28, 2002; Proceedings of Wowmon 2002, The 5th ACM International Workshop on Wireless Mobile Media, Atlanta Georgia.

International Preliminary Report on Patentability dated Jan. 11, 2011 from PCT/EP2009/057439.

International Search Report and Written Opinion dated Nov. 25, 2009 for PCT/EP2009/057440.

Nokia: "R3-080916—Multicast Mode in Improved GGSN Solution" 3GPP TSG-RAN WG3 Meeting #59BIS, Shenzhen China Mar. 31-Apr. 3, 2008.

Non-Final Rejection, U.S. Appl. No. 12/169,563 (now U.S. Pat. No. 8,599,733), dated Mar. 21, 2011.

Notice of Allowance, U.S. Appl. No. 12/169,563 (now U.S. Pat. No. 8,599,733), dated Jul. 26, 2013.

Notice of Allowance, U.S. Appl. No. 14/086,357 (now U.S. Pat. No. 9,154,321), dated Apr. 29, 2015.

Stewart, "Stream Control Transmission Protocol," Network Working Group, Request for Comments: 4960 (Sep. 2007).

* cited by examiner

CONFIGURING A MULTICAST OR BROADCAST WIRELESS NETWORK

CROSS REFERENCE TO RELATED APPLICATION

This application is a continuation of U.S. patent application Ser. No. 14/086,357, filed Nov. 21, 2013, which is a continuation of U.S. patent application Ser. No. 12/169,563, filed Jul. 8, 2008, which issued as U.S. Pat. No. 8,599,733 on Dec. 3, 2013, which are incorporated by reference as if fully set forth.

FIELD

The field of the invention relates generally to cellular communication. More particularly, the field of the invention relates to a method and apparatus for providing cell configuration information to a network element.

BACKGROUND

In a typical cellular network, such as a Universal Terrestrial Radio Access-Time Division Duplex (UTRA-TDD) network, a Radio Network Controller (RNC) is responsible for the configuration of a set of cells. The configuration of the cells is typically achieved using a standardised protocol, such as the 3GPP (3rd Generation Partnership Project) Node-B Application Part (NBAP) of the Iub interface. The implementation of the configuration of a cell from its RNC in conventional network architecture is based on a point-to-point connection from the RNC to each individual cell.

As will be appreciated by a skilled artisan, the network resources within a cellular network are limited, and as such any reduction of the signalling message flow and content between network elements is desirable. Furthermore, any reduction in the workload of the processing resources of RNCs, and the amount of time taken to reconfigure cells is also desirable.

Thus, there exists a continual need for improved methods and techniques for providing cell configuration information to network elements.

SUMMARY

Accordingly, embodiments of the invention seek to mitigate, alleviate or eliminate one or more of the abovementioned disadvantages singly or in any combination.

According to a first aspect of the invention, there is provided a network controller for supporting a multi-cell service in a cellular communication network. The network controller comprises an interface connection that is operably coupled to at least one network element supporting communication within a communication cell of the communication network. The network controller comprises signal processing logic for generating a cell configuration message comprising cell configuration information. Transmitting logic is for transmitting the cell configuration message to the at least one network element using a multicast protocol.

Thus, embodiments of the invention may allow a network controller to deliver cell configuration information to a plurality of network elements substantially simultaneously, with a single transmission. As a result, the bandwidth needed at the network controller end of an interface between the network controller and the network elements may be significantly reduced, along with the processing load for the network controller in relation to the provision of cell configuration information to the network elements. Furthermore, since cell configuration information may be transmitted substantially simultaneously to all of the network elements, the time needed to reconfigure a plurality of cells may be significantly reduced, in particular when a large number of cells need to be reconfigured.

According to optional features of the invention, the cellular communication network may comprise a plurality of communication cell clusters, and each cell cluster in turn comprises a plurality of communication cells, such that the transmitting logic may be further operable to transmit the cell configuration message to a plurality of network elements within a communication cell cluster. In this manner, the multicast transmission of cell reconfiguration information may be broadcast to multiple network elements.

According to optional features of the invention, the multicast protocol may comprise the Internet Group Management Protocol (IGMP), and the network controller may transmit the cell configuration message using a Stream Control Transmission Protocol (SCTP).

According to a further optional feature of the invention, the cell configuration information may comprise one or more from a group of:

(i) Common Physical CHannel (CPCH) configuration information;
(ii) Forward Access CHannel (FACH) configuration information;
(iii) Paging CHannel (PCH) configuration information;
(iv) Paging Indicator CHannel (PICH) configuration information;
(v) MBMS paging Indicator CHannel (MICH) configuration information;
(vi) timeslot configuration information;
(vii) Packet Random Access CHannel (PRACH) configuration information;
(viii) Random Access CHannel (RACH) configuration information; and
(ix) Fast Physical Access CHannel (FPACH) configuration information.

According to a further optional feature of the invention, the network controller may comprise enabling logic operable to enable the at least one network element to subscribe to a multi-cell service by, for example, way of the Internet Group Management Protocol (IGMP).

According to an optional feature of the invention, the network controller may comprise a first receiving logic operable to receive via a unicast protocol an acknowledgement messages from at least one network element, and acknowledge receipt of cell configuration information.

According to an optional feature of the invention, the signal processing logic may be further operable, upon failure to receive an acknowledgement message from a network element subscribed to a multi-cell service following transmission of cell configuration information using the multicast protocol, to re-transmit the configuration information to the network element from which an acknowledgement message was failed to be received, using a unicast protocol. Optionally, the unicast protocol may comprise an Internet Protocol (IP).

According to an optional feature of the invention, the network controller may comprise address logic operable to use a substantially unique multicast address for signalling purposes, at least with respect to other network controllers within the communication network.

According to a second aspect of the invention, there is provided a network element for supporting communication within a communication cell of a cellular communication network. The network element comprises a receive logic module for to receiving cell configuration information for providing a multi-cell service from a network controller using a multicast protocol.

According to a third aspect of the invention, there is provided a method for providing cell configuration information for a multi-cell service to a network element supporting communication within a communication cell of a communication network. The method comprises the steps of generating a cell configuration message comprising cell configuration information for providing a multi-cell service, and transmitting the cell configuration message to the at least one network element using a multicast protocol.

According to a fourth aspect of the invention, there is provided a cellular communication system comprising a network controller adapted to support the abovementioned method for providing cell configuration information for a multi-cell service to a network element.

According to a fifth aspect of the invention, there is provided an integrated circuit for supporting multimedia broadcast communications over a communication system, the integrated circuit comprising message generation logic for generating a cell configuration message comprising cell configuration information for providing a multi-cell service; and a transmitting logic for transmitting the cell configuration message to at least one network element using a multicast protocol.

According to a sixth aspect of the invention, there is provided a computer-readable medium having executable program code, for programming signal processing logic to perform the abovementioned method for providing cell configuration information for a multi-cell service to a network element.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The demand for multimedia services that can be received via mobile communication devices, such as mobile telephone handsets and other handheld devices, is expected to grow rapidly. One technology for delivering multimedia broadcast services over cellular communication networks is the Multimedia Broadcast and Multicast Service (MBMS) developed by the 3rd Generation Partnership Project (www.3gpp.com).

A particular variant of MBMS comprises a network operating in a broadcast only mode for Multicast/Broadcast over a single Frequency Network (MBSFN). In such a dedicated broadcast cellular network, all cells involved in the broadcast of a service will have an identical configuration of the physical resources used for that service. In essence, all cells involved in the broadcast of the service will be configured to transmit an identical and time synchronous waveform for that service.

Embodiments of the invention will be described in a context of a Universal Mobile Telecommunications System (UMTS) Terrestrial Radio Access Network (UTRAN) system. However, it will be appreciated that embodiments of the invention are not limited to a UTRAN system, but may be implemented within alternative cell-based communication systems, for example a WiMAX (Worldwide Interoperability for Microwave Access) network system, with which multiple communications cells are to be provided with substantially the same configuration information.

Figure 1:
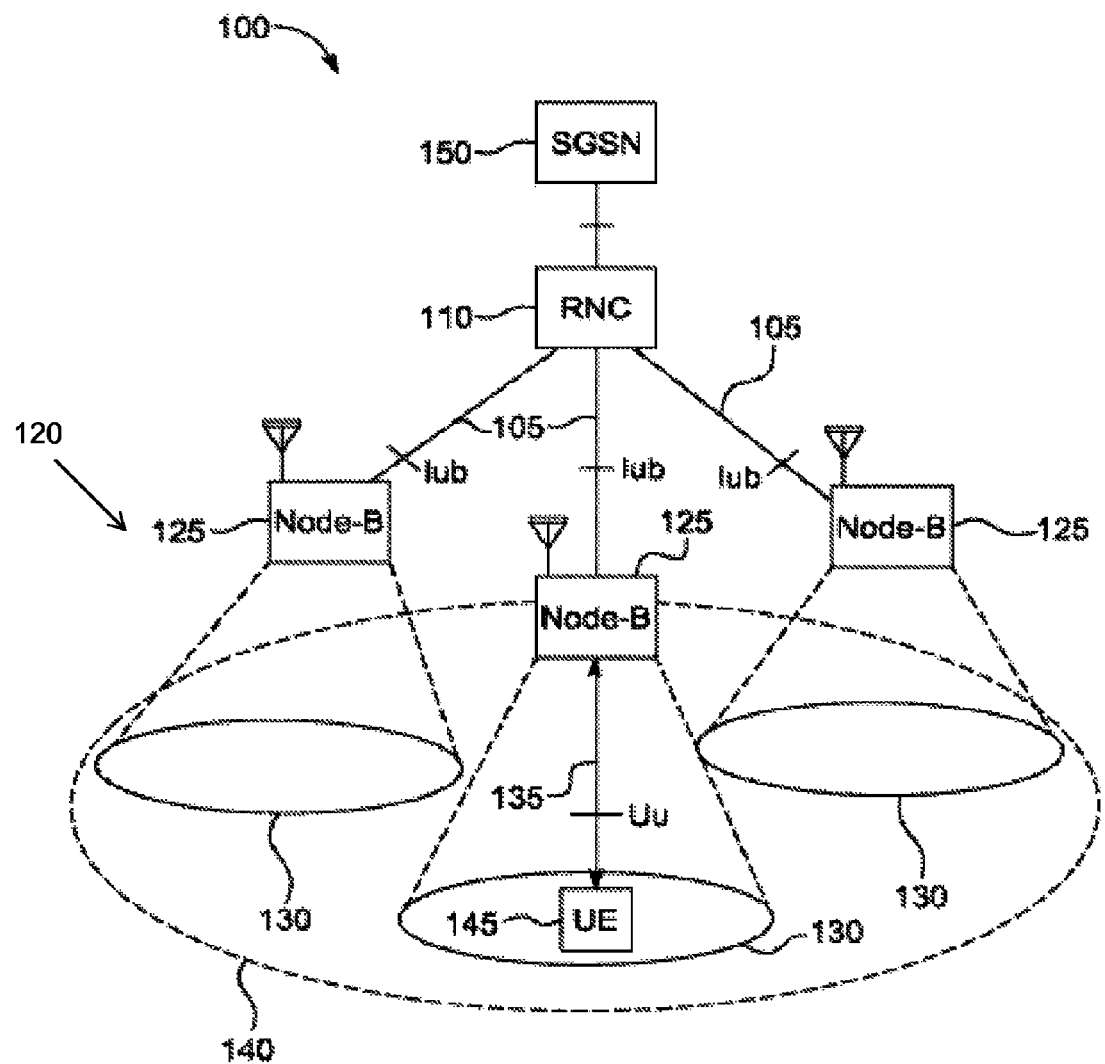
FIG. 1 illustrates an example of a block diagram of part of a cellular communication system.

Referring now to FIG. 1, there is illustrated an example of a block diagram of part of a cellular communication system 100, which for the illustrated embodiments comprise a part of a UTRAN system. The system 100 comprises a network controller, which for the illustrated embodiments are in a form of a Radio Network Controller (RNC) 110. The RNC 110 is operably coupled to one or more network elements for supporting communication within respective communication cells 130 of the communication network 120. For the illustrated embodiments, the network elements are in a form of wireless base stations, referred to in 3GPP parlance as Node-Bs 125, and the RNC 110 is operably coupled to the Node-Bs 125 via an Iub interface 105.

For completeness, the RNC 110 of FIG. 1 is further operably coupled to a Serving General Packet Radio System (GPRS) Support Node (SGSN) 150 via IuPS interface, as shown.

In accordance with embodiments of the invention, the communication network 120 of FIG. 1 may be configured to deliver multi-cell services to mobile communication devices, such as User Equipment (UE) 145, located within the communication cells 130, via an air interface Uu 135. For example, a multi-cell service may comprise a broadcast service that may be provided to wireless communication devices over the communication network 120 via Node-Bs. In particular, the communication network 120 of FIG. 1 may be configured to operate in a broadcast only mode for Multicast/Broadcast over a single Frequency Network (MBSFN). In this manner, each individual communication cell 130 may form a part of a cluster of communication cells 140, a cluster defining a subset of the communication cells 130 within the system 100, or all of the communication cells 130 within the system 100. Multi-cell services such as broadcast services may then be transmitted substantially simultaneously using identical physical resources by all communication cells 130 of a cluster 140.

Figure 2:
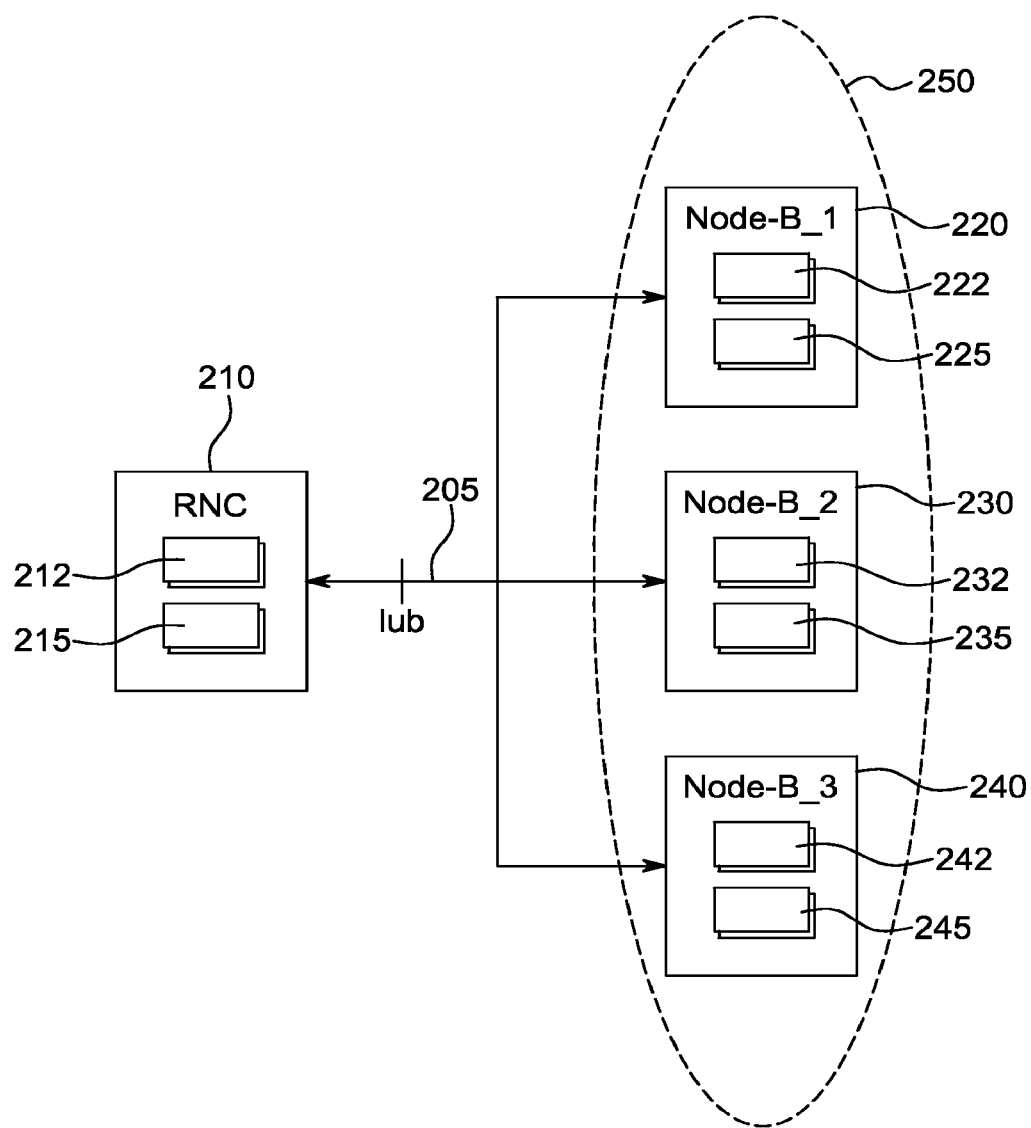
FIG. 2 illustrates an example of an RNC adapted according to embodiments of the invention.

Referring now to FIG. 2, there is illustrated an example of an RNC 210 adapted according to embodiments of the invention, operably coupled to Node-Bs 220, 230, 240 via an Iub interface 205. The RNC 210 comprises signal processing logic module 212 and memory element 215. Similarly, each of the Node-Bs 220, 230, 240 comprises signal processing logic module 222, 232, 242 and memory element 225, 235, 245 respectively.

In accordance with embodiments of the invention, the signal processing logic module 212 of the RNC 210 is operable to generate a cell configuration message comprising cell configuration information for providing a multi-cell service, and to transmit the cell configuration message to the Node-Bs 220, 230, 240 using a multicast protocol.

In this manner, the RNC 210 is able to deliver the configuration information to a plurality of Node-Bs, for example all Node-Bs 220, 230, 240 within a cluster 250 substantially simultaneously, within a single transmission. As a result, the bandwidth needed at the RNC end of the Iub interface 205 may be significantly reduced, along with the processing load for the RNC 210 in relation to the provision of cell configuration information to the Node-Bs 220, 230, 240. Furthermore, since cell configuration information may be transmitted substantially simultaneously to all of the Node-Bs 220, 230, 240 within the cluster 250, the time needed to reconfigure a plurality of cells may be significantly reduced, in particular when a large number of cells need to be reconfigured. By way of example, a configuration message may comprise 400 bytes, and an acknowledgement message may comprise 50 bytes. Configuring 50 cells within a cluster using the prior art method of individually sending configuration messages to each cell using a unicast protocol would use 50×400 bytes for the configuration messages, and 50×50 bytes for the acknowledgement messages (assuming no need for retransmissions). Thus, using the prior art method, a total of 22500 bytes are transmitted. However, configuring the 50 cells within the cluster using a multicast protocol in accordance with examples of the present invention would only use a single 400 bytes configuration message. Accordingly, a total of only 2900 bytes would be required to be transmitted, a reduction by a factor of approximately eight in the number of bytes transmitted.

The RNC 210 may be operable to use any suitable multicast protocol to transmit the cell configuration information. For example, the RNC 210 may use a packet-based multicast protocol such as the Internet Group Management Protocol (IGMP). In this manner, all Node-Bs 220, 230, 240 providing a particular multi-cell service may be configured to join the appropriate multicast group corresponding to that multi-cell service.

As will be appreciated by a skilled artisan, there are several versions of IGMP, as defined by RFC (Request for Comments) documents of the IETF (Internet Engineering Task Force). IGMP v1 is defined by RFC 1112, IGMP v2 is defined by RFC 2236, and IGMP v3 is defined by RFC 3376.

The RNC 210 may be further operable to transmit the cell configuration message using a variant of a Stream Control Transmission Protocol (SCTP). As will be appreciated by a skilled artisan, SCTP is transport layer protocol developed by the IETF (Internet Engineering Task Force) Signalling Transport working group, and defined in RFC 4960, and which is traditionally related to one IP address and one port. SCTP is generally accepted as being a faster, more reliable protocol than, say, TCP (Transport Control Protocol). Furthermore, SCTP does not require acknowledgement messages to be provided at the NBAP (Node-B Application Part) level, as is the case for UDP (User Datagram Protocol). Accordingly, a variant of SCTP relating to both a multicast IP address and port and a unicast IP address and port may be utilised. In this manner, an SCTP downlink may be employed via the multicast address and port, whilst the uplink may be employed via the unicast address and port.

The cell configuration information may comprise any information that enables a Node-B to be configured to provide a multi-cell service to mobile communications devices within its respective cell. For example, the cell configuration information may comprise one or more from a group of:

(i) Common Physical CHannel (CPCH) configuration information;
(ii) Forward Access CHannel (FACH) configuration information;
(iii) Paging CHannel (PCH) configuration information;
(iv) Paging Indicator CHannel (PICH) configuration information;
(v) MBMS paging Indicator CHannel (MICH) configuration information;
(vi) timeslot configuration information;
(vii) Packet Random Access CHannel (PRACH) configuration information;
(viii) Random Access CHannel (RACH) configuration information; and
(ix) Fast Physical Access CHannel (FPACH) configuration information.

Figure 3:
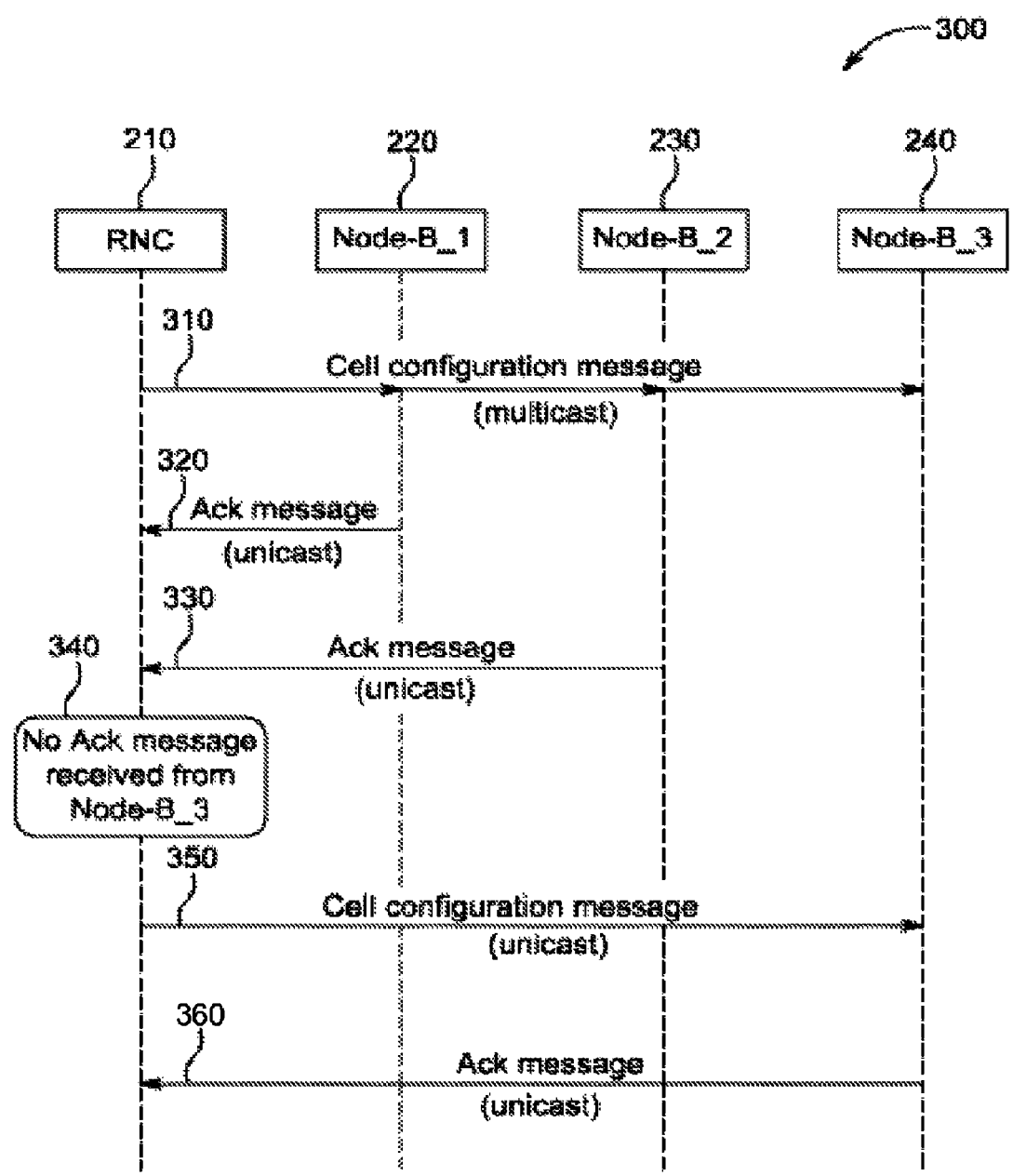
FIG. 3 illustrates an example of a simplified signalling diagram for the RNC of FIG. 2 according to embodiments of the invention.

Referring now to FIG. 3, there is illustrated an example of a simplified signalling diagram 300 for the RNC 210 of FIG. 2 to provide cell configuration information, for providing a multi-cell service, to the Node-Bs 220, 230, 240.

As previously mentioned, the RNC 210 is operable to generate a cell configuration message comprising cell configuration information for providing a multi-cell service, and to transmit the cell configuration message to the Node-Bs 220, 230, 240 using a multicast protocol. Accordingly, the RNC 210 transmits the cell configuration message 310 substantially simultaneously to all of the Node-Bs 220, 230, 240 using a multicast protocol. Upon receipt of the cell configuration message 310, the Node-Bs 220, 230 respond by transmitting acknowledgement messages 320, 330 back to the RNC 210 using a unicast protocol, acknowledging receipt of the cell configuration message. As will be appreciated by a skilled artisan, acknowledgement messages may be transmitted at any appropriate level, for example at the SCTP level or at the NBAP level.

For the example illustrated in FIG. 3, the RNC 210 fails to receive an acknowledgement message from one of the Node-Bs, Node-B_3 240, as illustrated by box 340. Accordingly, upon failure to receive an acknowledgement message from Node-B_3 240, the RNC 210, or more specifically for the embodiments illustrated in FIG. 2 the signal processing logic module 212 thereof is operable to retransmit the configuration information to Node-B_3 240 from which an acknowledgement message was failed to be received. The signal processing logic module 212 may retransmit the configuration information to Node-B_3 240 using a unicast protocol 350, for example a packet-based unicast protocol such as a unicast IP protocol. By way of example, the signal processing logic module 212 may simply re-transmit the cell configuration message originally generated for multicast transmission. Alternatively, the signal processing logic module 212 may generate a new cell configuration message, comprising the cell configuration information, specifically for re-transmission using a unicast protocol to the, or each, Node-B from which an acknowledgement message was not received. Upon receipt of the cell configuration message 350, the Node-B 240 responds by transmitting acknowledgement messages 360 back to the RNC 210 using a unicast protocol, acknowledging receipt of the cell configuration message.

In this manner, the RNC 210 only resorts to unicast, point-to-point signalling for Node-Bs that fails to acknowledge receipt of the initial multicast message. Thus, depending upon the probability of packet loss over the Iub interface

205, the net result will typically be an overall reduction in the amount of traffic generated for any reconfiguration of the network resources and a shortening of the reconfiguration period.

Alternatively, where acknowledgement messages fail to be received from a plurality of Node-Bs, the signal processing logic module 212 may retransmit the configuration information to the Node-Bs using a multicast protocol, in order to again minimise the number of transmissions needed to be made by the signal processing logic module 212. In particular, the signal processing logic module 212 may determine whether to retransmit the configuration information using a unicast or multicast protocol based on a trade-off between the number of unicast configuration information messages that the signal processing logic module would need to transmit, and the number of unnecessary acknowledgement messages that would result from a multicast configuration information message.

In accordance with embodiments of the invention, and in a system with multiple RNCs, each RNC may use a substantially unique multicast address for signalling purposes, at least with respect to other network controllers within the communication network. In this manner, Node-Bs may be controlled by a specific RNC through configuration of the control plane multicast subscription information of the Node-Bs.

Figure 4:
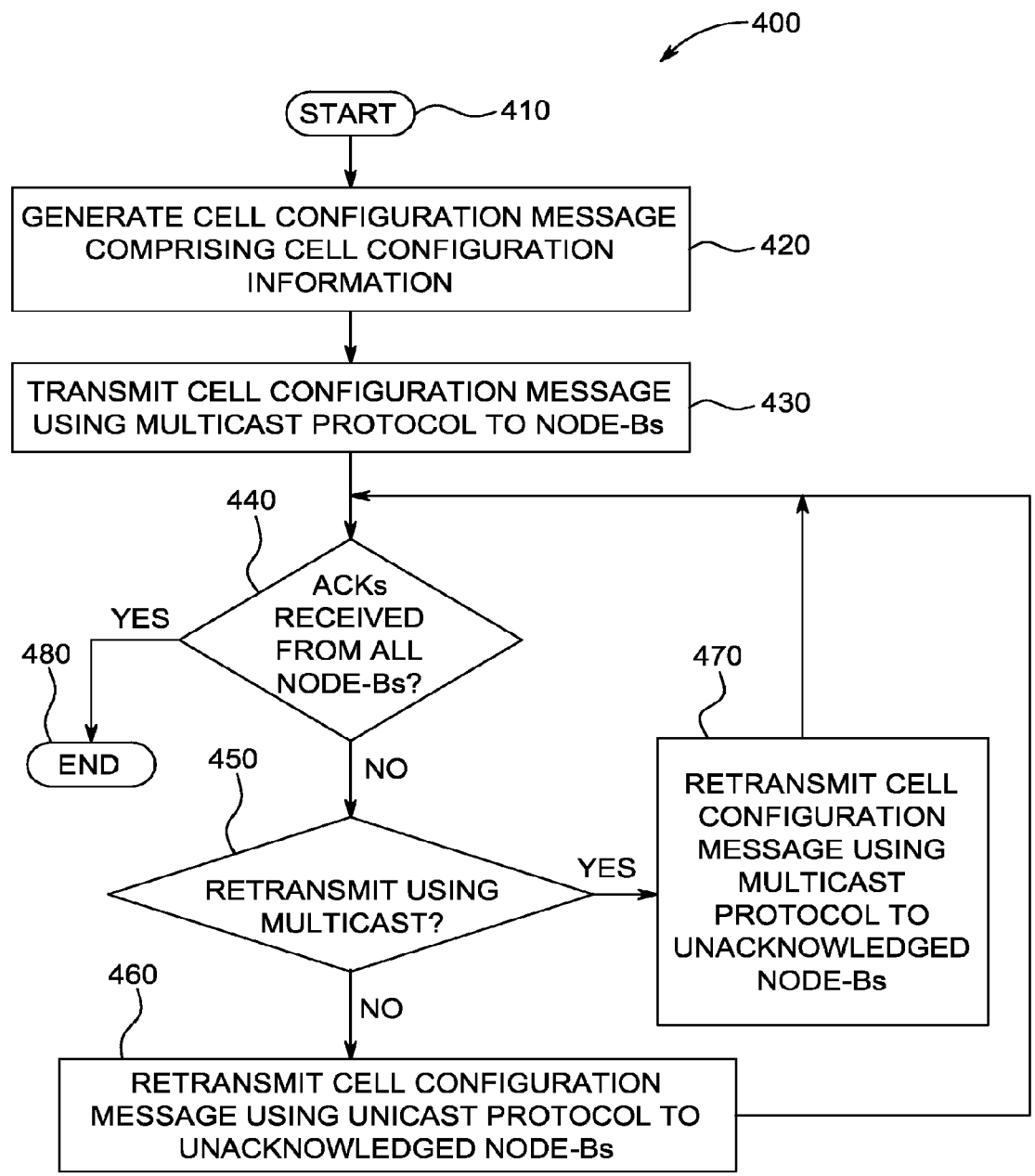
FIG. 4 illustrates an example of a simplified flowchart of a method of providing cell configuration information for a multi-cell service according to embodiments of the invention.

Referring now to FIG. 4, there is illustrated an example of a simplified flowchart 400 of a method for providing cell configuration information for a multi-cell service, for example a broadcast service, to a network element supporting communication within a communication cell of a communication network according to embodiments of the invention. For example, the method of FIG. 4 may be implemented in the form of computer-readable code stored within, say, the memory element 215 of RNC 210 of FIG. 2, for programming the signal processing logic module 212 to perform the method.

The method starts at step 410, and moves to step 420, with the generation of a cell configuration message comprising cell configuration information for providing a cell multi-cell service. Next, in step 430, the cell configuration message is transmitted using a multicast protocol to one or more Node-Bs.

If acknowledgement messages are not received from all of the Node-Bs subscribed to the relevant multicast group in step 440, the method moves on to step 450, where it is determined whether to retransmit the configuration information using the multicast protocol, or to re-transmit the configuration information using a unicast protocol. For example, it may be determined whether to re-transmit the configuration information using a unicast or multicast protocol based on a trade-off between the number of unicast configuration information messages that would need to transmitted to the unacknowledged Node-Bs, and the number of unnecessary acknowledgement messages that would result from a multicast configuration information message.

If it is determined to re-transmit the configuration information using a unicast protocol, the method moves to step 460, where the cell configuration message is re-transmitted to those Node-Bs from which acknowledgement messages have not been received, using a unicast protocol. The method then loops back to step 440.

If it is determined to re-transmit the configuration information using a multicast protocol, the method moves to step 470, where the cell configuration message is re-transmitted to, for example all of the one or more Node-Bs, using a multicast protocol. The method then loops back to step 440.

Once acknowledgement messages have been received from all of the Node-Bs subscribed to the relevant multicast group, the method ends, at step 480.

Figure 5:
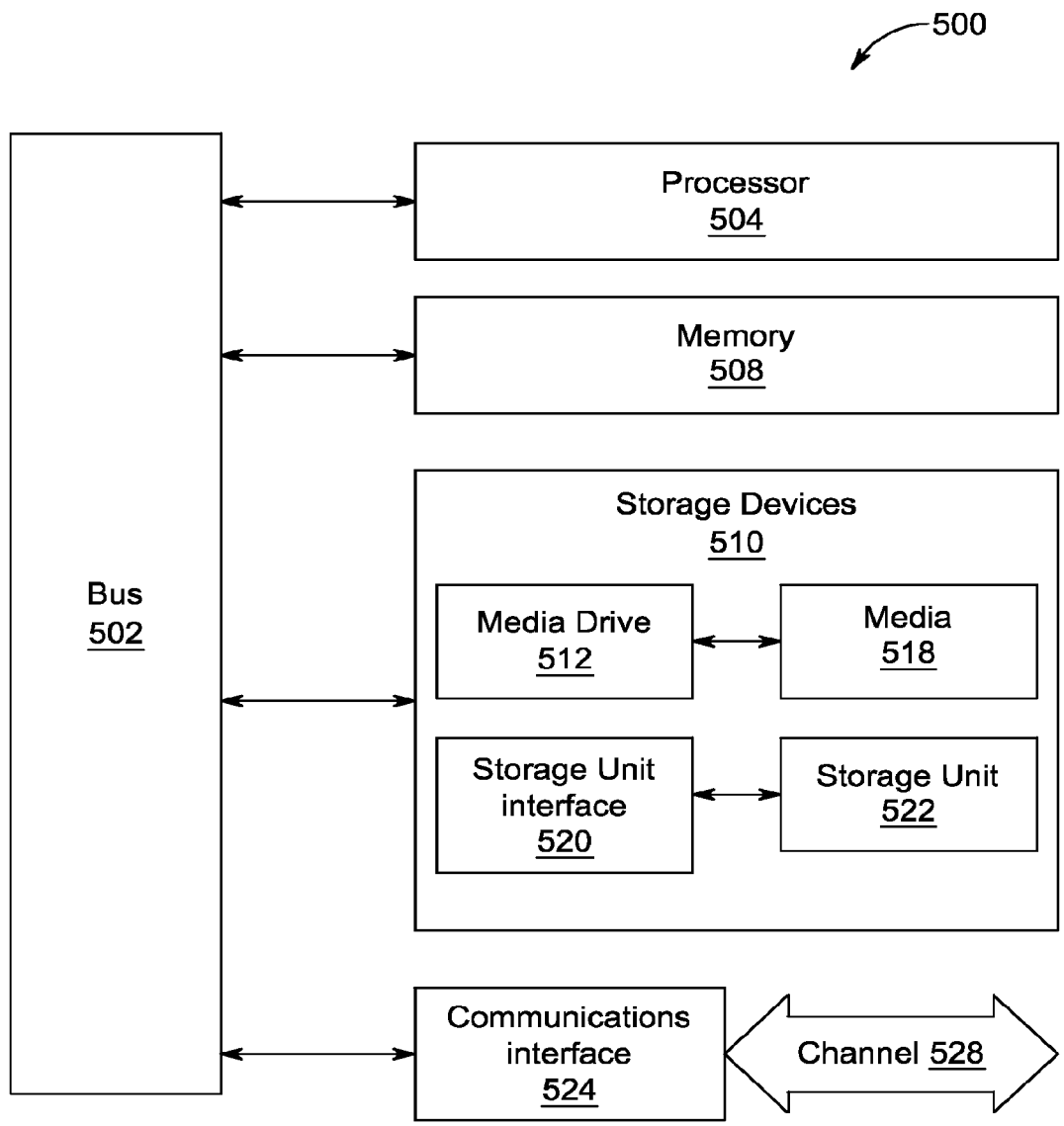
FIG. 5 illustrates a typical computing system that may be employed to implement processing functionality in embodiments of the invention.

FIG. 5 illustrates a typical computing system 500 that may be employed to implement processing functionality in embodiments of the invention. Computing systems of this type may be used in a network controller or other network element (which may be an integrated device, such as a mobile phone or a USB/PCMCIA modem), for example. Those skilled in the relevant art will also recognize how to implement the invention using other computer systems or architectures. Computing system 500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory (ROM) or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 518 may include, for example, a hard disk, floppy disk, magnetic tape, optical disk, CD or DVD, or other fixed or removable medium that is read by and written to by media drive 512. As these examples illustrate, the storage media 518 may include a computer-readable storage medium having stored therein particular computer software or data.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 522 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a universal serial bus (USB) port), a PCMCIA slot and card, etc.

Software and data transferred via communications interface 524 are in the form of signals which can be electronic, electromagnetic, and optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 508, storage device 510, or storage unit 522. These and other forms of computer-readable media may store one or more instructions for use by processor 504, to cause the processor to perform specified operations. Such instructions, generally referred to as 'computer program code' (which may be grouped in the form of computer programs or other groupings), when executed, enable the computing system 500 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 522, drive 512 or communications interface 524. The control logic module (in this example, software instructions or computer program code), when executed by the processor 504, causes the processor 504 to perform the functions of the invention as described herein.

It will be appreciated that, for clarity purposes, the above description has described embodiments of the invention with reference to general functional units and processors. However, it will be apparent that any suitable distribution of functionality between different functional units, processors or domains may be used without detracting from the invention. For example, functionality illustrated to be performed by a signal processing logic module may be performed by separate processors or controllers, or may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A networking device comprising:
    an interface configured to communicate with a cluster of network elements;
    a processor, of the networking device, configured to multicast a Multicast-Broadcast over a Single Frequency Network (MBSFN) message to the cluster of network elements and to receive at least two acknowledgement messages from the cluster of network elements; and
    the processor is further configured to retransmit the MBSFN message, by multicasting to unacknowledged network elements in the cluster of network elements, subsequent to a time period to receive an acknowledgement message from a first and a second network element.

2. The networking device of claim 1, wherein multicasting uses Internet Group Management Protocol (IGMP).

3. The networking device of claim 1, wherein the processor is further configured to multicast the MBSFN message using Stream Control Transmission Protocol (SCTP), Transport Control Protocol (TCP), or User Datagram Protocol (UDP).

4. The networking device of claim 1, wherein the networking device is configured as a Universal Mobile Telecommunications System (UMTS) Terrestrial Radio Access Network (UTRAN), a Worldwide Interoperability for Microwave Access (WiMAX), or a Radio Network Controller (RNC) device.

5. A method performed by a networking device, the method comprising:
    communicating, by the networking device using an interface, with a cluster of network elements;
    multicasting, by the networking device, a Multicast-Broadcast over a Single Frequency Network (MBSFN) message to the cluster of network elements;
    receiving, by the networking device from the cluster of network elements, at least two acknowledgement messages; and
    retransmitting, by the networking device by multicasting to unacknowledged network elements in the cluster of network elements, the MBSFN message subsequent to a time period to receive an acknowledgement message from a first and a second network element.

6. The method of claim 5, wherein multicasting uses Internet Group Management Protocol (IGMP).

7. The method of claim 5 further comprising:
multicasting, by the networking device, the MBSFN message using Stream Control Transmission Protocol (SCTP), Transport Control Protocol (TCP), or User Datagram Protocol (UDP).

8. The method of claim 5, wherein the networking device is configured as a Universal Mobile Telecommunications System (UMTS) Terrestrial Radio Access Network (UTRAN), Worldwide Interoperability for Microwave Access (WiMAX), or a Radio Network Controller (RNC) device.

* * * * *